United States Patent [19]

Dorfman et al.

[11] 3,983,185
[45] Sept. 28, 1976

[54] HALOGEN CONTAINING POLYESTER RESINS HAVING IMPROVED SMOKE-RESISTANCE

[75] Inventors: Edwin Dorfman, Grand Island; Raymond R. Hindersinn, Lewiston; Willis T. Schwartz, Jr., Grand Island, all of N.Y.

[73] Assignee: Hooker Chemicals & Plastics Corporation, Niagara Falls, N.Y.

[22] Filed: Oct. 15, 1974

[21] Appl. No.: 514,984

Related U.S. Application Data

[63] Continuation-in-part of Ser. Nos. 383,749, July 30, 1973, and Ser. No. 490,423, July 22, 1974.

[52] U.S. Cl. .................. 260/863; 260/45.75 B; 260/45.75 D; 260/45.75 P
[51] Int. Cl.$^2$............................................. C08J 3/20
[58] Field of Search ............. 260/45.75 P, 45.75 D, 260/863, 873, 45.75 B

[56] References Cited
UNITED STATES PATENTS

| | | | |
|---|---|---|---|
| 2,863,795 | 12/1958 | Robitschek et al. | 260/30.6 R |
| 3,007,958 | 11/1961 | Robitschek et al. | 260/75 A |
| 3,202,567 | 8/1965 | Muri et al. | 260/45.75 W |
| 3,239,482 | 3/1966 | Rapp | 260/41 |
| 3,326,832 | 6/1967 | Rauschenbach et al. | 260/28.5 |
| 3,373,225 | 3/1968 | Degginger | 260/863 |
| 3,418,267 | 12/1968 | Busse | 260/45.7 P |
| 3,595,815 | 7/1971 | Willersinn et al. | 260/45.75 P |
| 3,721,634 | 3/1973 | Versnel | 260/45.7 P |
| 3,810,861 | 5/1974 | Tacke et al. | 260/45.75 P |
| 3,821,151 | 6/1974 | Mitchell | 260/45.75 |
| 3,829,400 | 8/1974 | Kato et al. | 260/45.75 D |

OTHER PUBLICATIONS

Chemical Abstracts – vol. 67, 1967, p. 8624 citation No. 91365V.

Journal of Fire and Flammability – pp. 51 to 84, 1972 – James J. Pitts.

*Primary Examiner*—V.P. Hoke
*Attorney, Agent, or Firm*—Peter F. Casella; James F. Mudd; David A. Stein

[57] ABSTRACT

Fire retardant polymer compositions having improved smoke-retardance are prepared from:
1. a copolymerizable mixture of:
   a. from about 50 to 80 weight percent of an $\alpha$-,$\beta$-, ethylenically unsaturated halogen-containing polyester of a polycarboxylic compound and a polyhydric alcohol, the polyester containing halogen in a proportion of greater than about 4 weight percent; and
   b. from about 20 to about 50 weight percent of a mixture of unsaturated monomers comprising a vinyl-benzene compound and an acrylic compound selected from the group consisting of acrylic acid, methacrylic acid and esters of these acids, the weight ratio of vinylbenzene compound to acrylic compound being about 1:4 to 4:1; and
2. an effective fire retardant proportion of about 0.5 to about 10 weight percent of a smoke inhibiting additive comprising at least 0.5 weight percent of a compound of iron as the sole fire retardant additive or as a component of an additive mixture of an iron compound and an antimony compound and/or a copper compound.

46 Claims, No Drawings

HALOGEN CONTAINING POLYESTER RESINS HAVING IMPROVED SMOKE-RESISTANCE

REFERENCE TO CO-PENDING APPLICATIONS

This is a continuation-in-part of our copending applications Ser. No. 383,749 filed July 30, 1973 and Ser. No. 490,423 filed July 22, 1974.

BACKGROUND OF THE INVENTION

During recent decades, the growth of the plastics industry and ever-increasing use of polymeric materials has coincided with an increasing awareness and concern for the safety hazards, especially with regard to fire hazards of such materials. One result has been the development of various fire retardant polymeric compositions and fire retardant additives for polymeric compositions. In past years, the major emphasis in the development of such fire retardant compositions has been in the achievement of low burning rates. More recently, however, there has been an increasing recognition of the hazards of smoke generation during fire and the advantages of char formation in inhibiting combustion. Furthermore, it is now more generally recognized that low burning rates do not necessarily imply or result in low smoke generation or beneficial char formation. As a result, the need is now recognized for the development of improved fire retardant polymeric systems having not only low burning rates, but low smoke generation and high char formation.

Among the developments in the field of fire retardant polymeric systems in recent years, the development of polymeric systems employing antimony trioxide as a fire retardant additive has been outstanding. Antimony trioxide has been found especially effective for use in systems based on halogen containing polymers. The effectiveness of antimony trioxide, as well as other antimony compounds as a fire retardant additive to halogen containing polymers is generally recognized and has been described as a synergistic effect between antimony and halogen. Despite its generally recognized effectiveness in such systems, the use of antimony trioxide, as well as other antimony compounds, has been found to result in certain disadvantages. For example, although the use of antimony compounds has been shown in many instances to advantageously decrease flammability and burning rate of polymer systems, it appears to provide little advantage in inhibiting of smoke and in some instances has been found to increase smoke formation. In addition, in recent years, the rapidly rising cost of antimony compounds has been an economic disadvantage.

As a result of these disadvantages associated with the use of antimony compounds as fire retardant additives, considerable effort has been expended in a search for other fire retardant additives. However, the effectiveness of a particular fire retardant additive in a polymeric system is generally unpredictable and an additive useful and compatible in one polymeric system may be ineffective or even harmful with regard to fire retardance as well as other properties when used in a different polymeric system. Even more unpredictable is the effect achieved when fire retardant additives are combined. Combinations of various fire retardant additives may result in a beneficial or detrimental formulation with a given polymeric system. Furthermore, combinations of fire retardant additives may benefit one aspect of fire retardance and be detrimental to another.

It is known from The Journal of Fire and Flammability, 51–84, 1972, James J. Pitts, that in some instances at relatively high levels of addition, iron oxides or copper oxides may serve effectively as a partial replacement for antimony oxide in chlorine containing urethane foams. The use of iron or copper oxides in combination or in combination with antimony oxide at lower levels of addition or in other polymer systems is not shown.

It is also known from copending application Ser. No. 383,749, filed July 30, 1973, to employ iron compounds as fire retardant additives in polymer compositions prepared from halogen containing unsaturated polyester resins. In Ser. No. 383,747, filed July 30, 1973, it is disclosed that copper compounds can be advantageously employed as fire retardant additives in halogen containing unsaturated polyester resins. In copending application Ser. No. 490,423 it is disclosed that iron compounds may be advantageously combined with copper compounds and/or antimony compounds to provide a composition useful as a fire retardant additive in halogen containing unsaturated polyester resins. The polymeric compositions prepared in accordance with the aforementioned copending applications exhibit excellent fire retardant properties, including low smoke generation. However, it has now been found that substantial improvements in fire retardance and low smoke generation are achieved in such compositions when the halogen containing unsaturated polyesters are cross-linked with certain combinations of unsaturated monomers in a manner described hereinbelow.

Accordingly, it is an object of this invention to provide superior fire retardant polymer compositions based on unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to provide polymer compositions based on unsaturated polyester resins wherein substantial improvements in fire retardance are achieved without diminishing or deteriorating other useful properties of the polymer system.

These and other objects are accomplished by this invention which is described in detail hereinafter.

SUMMARY OF THE INVENTION

The improved fire retardant polymer compositions of this invention comprise:
1. a copolymerizable mixture of:
   a. from about 50 to 80 wt. % of an $\alpha,\beta$, ethylenically unsaturated halogen-containing polyester of a polycarboxylic compound and a polyhydric alcohol, the polyester containing halogen in a proportion of greater than about 4 weight percent; and
   b. from about 20 to about 50 weight percent of a mixture of unsaturated monomers comprising a vinyl benzene compound and an acrylic compound selected from the group consisting of acrylic acid, methacrylic acid and esters of these acids, the weight ratio of vinylbenzene to acrylic compound being about 1:4 to 4:1, and
2. an effective fire retardant proportion of about 0.5 to about 10 weight percent of a smoke inhibiting additive comprising at least 0.5 weight percent of a compound of iron with the proviso that when the additive comprises as the sole component thereof a compound of iron that is soluble in said polyester, the compound of iron is free of iron-to-carbon bonds, the composition being substantially phosphorus-free and the proportions and weight percents being based on the weight of the copolymerizable mixture.

The smoke inhibiting additive may comprise a compound of iron as the sole effective component thereof or may preferably comprise a mixture of a compound of iron with a compound of copper and/or a compound of antimony, the compound of iron being present in an amount of at least about 0.5 weight percent and the total additive or additive mixture being present in an amount of up to about 10 weight percent, based on the weight of the copolymerizable mixture.

The additive may be incorporated in the polymer composition by adding and mixing with the copolymerizable mixture or to either component thereof prior to mixing. Final polymerization or curing of the copolymerizable mixture may be facilitated with the addition of a suitable polymerization catalyst and/or promoter. If it is desired that the polymeriable mixture is to be stored and/or shipped prior to final polymerization and cure, a polymerization inhibitor may advantageously be added.

Thus it will be seen that the present invention relates to fire retardant polymer compositions containing the aforementioned smoke inhibiting additive and in one aspect these compositions comprise a copolymerizable mixture, and in a second aspect, the copolymerized product thereof.

The fire retardant polymer compositions of the present invention are useful in the preparation of castings, laminated products, reinforced articles and the like having low burning rates, low smoke generation and beneficial char formation in the presence of a flame.

DESCRIPTION OF EMBODIMENTS

The Unsaturated Polyesters

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhyrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethylmaleic, itaconic, citraconic, zeronic, pyroinchoninic, mesaconic, aconitic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and mixtures thereof.

Suitable saturated polyhydric alcohols for use in the preparation of the polyester resins include ethylene glycol, diethylene glycol, propylene glycol, dipropylene glycol, butanediol, pentanediol, hexanediol, dibromoneopentyl glycol, neopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compound are 2,2-dichloroethanol; 1,1-dibromo-2-propanol; 2,2,2-tribromoethanol; 1,1,3,3-tetrabromo-2-proposal; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The unsaturated polyester resins of this invention contain greater than about 4 weight percent up to about 40 weight percent or more of halogen based on the weight of the unsaturated polyester resin and copolymerizable unsaturated monomers. The preferred halogenated unsaturated polyesters are those wherein the halogen is chlorine or bromine or a combination thereof. The proportion of halogen is preferably greater than 15 weight percent and even more preferably, greater than 20 weight percent when the halogen is chlorine.

The preferred unsaturated polyesters of the invention contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Pat. No. 2,779,701, issued Jan. 29, 1957 the disclosure of which is herein incorporated by reference. Other methods for incorporating either a polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Pat. No. 2,863,794, issued Dec. 9, 1958; (2) the reaction of a polyhydric alcohol adduct of hexahalocyclopentadiene with a polycarboxylic compound containing aliphatic carbon-to-carbon unsaturation disclosed and claimed in U.S. Pat. No. 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Pat. No. 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Pat. No. 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Pat. 2,890,144, issued June 9, 1959, and U.S. Pat. 2,898,256, issued Aug. 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are; 1,4,5,6,7,7-hexachlorobicyclo-(2.2.1)-5-heptene-2,3-dicarboxylic acid and anhydride, also known as chlorendic acid and anhydride; 1,4,5,6,7,7-hexabromobicyclo-(2.2.1)-5-heptene-2,3-dicarboxylic acid; 1,4,5,6,7,7-hexachloro-2-methylbicyclo-(2.2.1)-5-heptene-2,3-dicarboxylic anhydride; 1,4,5,6,7-tetrachloro-7,7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; 5,6,7,8,9,9-hexachloro-1,2,4,4,4a,5, 8,8a-octahydro-5,8-methano-2,3-naphthalene dicarboxylic acid and anhydride; 1,2,3,4,5,6,7,7-octachloro-3,6-methano-1,2,3,6-tetrahydrophthalic acid and anhydride; 2,3,-dicarboxy-5,8-endomethylene-5,6,7,8,9,9-hexachloro-1,2,3,4,4a,5,8-,8a-octahydronaphthalene anhydride; 2,3-bis(ethylene carboxy)-1,4,5,6,7,7-hexachlorobicyclo(2.2.1)5-heptene; and 1,4,5,6,7,7-hexachlorobicyclo-(2.2.1)-5-heptene-2,3-dicarbonyl chloride.

Among the adducts of hexahalocyclopentadiene and polyhydric alcohols which may be used are: 1,4,5,6,7,7-hexachloro-2,3-bis-hydroxymethylbicyclo-(2.2.1)-5-heptene; 1,4,5,6,7,7-hexachloro-2,3-bis-hydroxymethylbicyclo-(2.2.1)-2,5-heptadiene; 3-(1,4,5,6,7,7-hexachlorobicyclo-(2.2.1)-5-heptene-2-yl)-methoxy-1,2-propanediol; 1,4,5,6-tetrachloro-7,7-difluoro-2,3-bis-hydroxymethylbicyclo-(2.2.1)-5-heptene; 1,4,5,6,7,7-hexabromo-2,3-bis-hydroxy-methylbicyclo-(2.2.1)-5-heptene; 3-(1,4,5,6-tetrachloro-7,7-difluorobicyclo-(2.2.1)-5-heptene-2-yl)-methoxy-1,2-propane diol. These compounds and methods of preparation are disclosed in U.S. Pat. No. 3,007,958, issued Nov. 7, 1961.

It is also within the scope of the invention to use other halogen-containing polyesters such as those derived from tetrachlorophthalic acid or anhydride, and tetrabromophthalic acid or anhydride.

The halogen can be provided in the polyesters of the invention by a combination of the foregoing methods. Thus, an unsaturated polyester can be prepared using a halogenated dibasic acid such as chlorendic acid, and a brominated alcohol such as dibromopropanol.

The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about one hundred to two hundred degrees Celsius, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

UNSATURATED MONOMERS

The superior fire retardant properties, especially smoke retardance, of the polymeric compositions of this invention result, in part, from the use of certain combinations or mixtures of unsaturated monomers to cure or cross-link the halogen-containing ethylenically unsaturated polyesters. More specifically, the unsaturated monomers comprise a mixture of a vinyl benzene compound and an acrylic compound. Suitable vinyl benzene compounds include, for example, styrene, -methyl styrene, chloromethyl styrene, vinyl toluene, and the like and mixtures thereof.

Suitable acrylic compounds are acrylic acid, methacrylic acid and esters thereof and mixtures. The esters of acrylic acid and methacrylic acid that may be employed include for example, the alkyl esters such as methyl acrylate, methyl methacrylate, ethyl acrylate, ethyl methacrylate, propyl acrylate, propyl methacrylate, isopropyl acrylate, isopropylmethacrylate, butyl acrylate, butyl methacrylate, isobutyl acrylate, isobutyl methacrylate, sec-butyl acrylate, sec-butylmethacrylate, tertbutyl acrylate, tert-butylmethacrylate, pentyl acrylate, pentyl methacrylate, hexylacrylate, heptylacrylate, heptyl methacrylate, octylacrylate, octylmethacrylate, 2-ethylbutylacrylate, 2-ethylbutyl methacrylate, 2-ethylhexyl acrylate, 2-ethylhexyl methacrylate, and the like as well as the hydroxyalkyl acrylates and methacrylates, such as hydroxymethyl acrylate, hydroxymethyl methacrylate, hydroxyethyl acrylate, hydroxyethylmethacrylate, hydroxypropyl acrylate, hydroxypropyl methacrylate, hydroxybutyl acrylate, hydroxybutyl methacrylate, hydroxyoctylacrylate, hydroxyoctyl methacrylate, and the like, and the alkoxyalkyl acrylates and methacrylates such as 2-ethoxyethyl acrylate, 2-ethoxyethyl methacrylate, 2-methoxyethyl acrylate, 2-methoxyethyl methacrylate, 2-n-butoxyethylacrylate, 2-n-butoxyethyl acrylate, 2-n-butoxyethyl methacrylate, hexoxyethyl acrylate, hexoxyethyl methacrylate and the like, and mixtures of these. Other suitable acrylic compounds include, for example, aromatic esters of acrylic and methacrylic acid such as benzyl acrylate, alpha-naphthyl acrylate, beta-naphthyl acrylate, phenyl acrylate, and the like and the corresponding methacrylates. Also suitable are halogen containing esters such as the haloalkyl esters including for example, bromoethyl acrylate, bromoethyl methacrylate, chloroethyl acrylate, chloroethyl methacrylate, dichloropropyl acrylate, dichloropropyl methacrylate, dibromopropyl acrylate, dibromopropyl methacrylate, 2,2,2-trifluoroethyl acrylate, 2,2,2-trifluoroethyl methacrylate, 2,2,2-tribromoethyl acrylate, 2,2,2-tribromoethyl methacrylate, hexafluoroisopropyl acrylate, hexafluoroisopropyl methacrylate, as well as other halogen containing acrylic compounds such as pentachlorophenyl acrylate, 2-chloroacrylic acid, bicyclo(2.2.1)-5-heptene-2-methyl methacrylate, methyl-2-chloroacrylate, methyl-2-bromoacrylate, 1,1-dihydroperfluoroethyl methacrylate, and the like.

Other suitable acrylic compounds include, for example, 2-phenoxy acrylate, 2-nitroethyl acrylate, allyl acrylate, methallyl acrylate, propargyl acrylate, ethylene glycol monoacrylate, propylene glycol monoacrylate, tetrahydrofurfuryl acrylate, vinyl acrylate, beta-cyanoethyl acrylate, cyclopentyl acrylate, cyclohexyl acrylate, furfuryl acrylate, glycidyl acrylate, glyceryl monoacrylate, lead acrylate, ferric acrylate, zinc acrylate, allylacrylamide cinnamyl acrylate, isobutyl-2-cyanoacrylate, n-butyl-2-cyanoacrylate, propyl-2-cyano acrylate, methyl-2-cyanoacrylate, cyclol acrylate, dimethyl malate acrylate, diethyl malate acrylate and the like as well as the corresponding methacrylates.

For the preparation of fire retardant polymers having a higher cross-linking density, a greater hardness and higher heat deflection temperature, the acrylic component of the monomer mixture may be selected from various polyacrylic compounds, especially the di- and tri-acrylates or methacrylates. Typical of such compounds which may be employed in accordance with the present invention are ethylene gylcol diacrylate, ethylene glycol dimethacrylate, propylene glycol diacrylate, propylene glycol diacrylate, butylene glycol dimethacrylate, ethylene diacrylate, ethylene dimethacrylate, ethylidene diacrylate, ethylidene dimethacrylate, trimethylolpropane diacrylate, trimethylolpropane dimethacrylate, trimethylolethane trimethacrylate, pentaerythritol triacrylate pentaerythritol tetraacrylate, pentaerythritol tetramethacrylate, triethylene glycol dimethacrylate, trimethylolpropane triacrylate, trimethylol propane trimethacrylate, tetraethylene glycol diacrylate, bisphenol A dimethacrylate, bisphenol A diacrylate, ethoxylated bisphenol A diacrylate, ethoxylated bisphenol A dimethacrylate, propoxylated bisphenol C diacrylate, 2,2', 6,6'-tetrabromobisphenol A dimethacrylate, tetramethylene diacrylate, tetramethylene dimethacrylate, neopentyl glycol diacrylate, neopentyl glycol dimethacrylate, glycerol triacrylate, glycerol trimethacrylate, 2,3-dibromoneopentyl glycol diacrylate, 2,3-dibromoneopentyl glycol dimethacrylate, 2,3-dibromo-2-butene-1,4-diol diacrylate, trans-2,3-dibromo-1-butene-1,4-diol diacrylate 2-butyne-1,4-diol dimethacrylate, crotylacrylate, 1,2,6-hexanetriol diacrylate, 2-butene-1,4-diacrylate, 2-butene-1,4-dimethacrylate, 1,4-cyclohexanediol diacrylate, 1,4-cyclohexanediol dimethacrylate, 1,4-cyclohexyl diacrylate, 1,4-cyclohexyl dimethacrylate, p-xylene diacrylate, 1-phenylethylene 1,2-dimethacrylate, 1,3-propanediol diacrylate, 1,3-propanediol dimethacrylate, and the like.

The prefered acrylic compounds are the alkyl-, hydroxy- alkyl-, and haloalkyl-acrylates and methacrylates wherein the alkyl group is from 1 to 8 carbon atoms.

The monomer composition may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The mixture of unsaturated monomers can be advantageously combined with the polymerizable polyester while both are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and unsaturated monomers, particularly if the mixture is to be stored or shipped in commerce prior to curing, are substance such as hydroquinone, benzoquinone, para-tertiarylbutyl catechol, para-phenylene diamine, trinitrobenzene, picric acid and the like.

The proportion of unsaturated monomer mixture 2 may vary considerably but preferably ranges from about 20 to about 50 percent by weight of the copolymerizable mixture and most preferably from about 25 to about 35 percent by weight of the copolymerizable mixture. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are generally used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar to or smaller than that stated for the catalysts.

SMOKE-RETARDANT ADDITIVE

The smoke retardant additive which is incorporated in the copolymerizable mixture in accorodance with this invention, comprises a compound of iron as the sole fire-retardant additive or as a component of an additive mixture comprising a compound of iron and a compound of copper and/or a compound of antimony. Substantial improvement in fire-retardance and smoke retardance of the polymer is achieved when the additive is employed in a proportion of from about 0.5 to about 10, preferably from about 1 to 5, weight percent and including at least about 0.5 weight percent of iron compound based on the weight of the copolymerizable mixture. When the additive comprise a mixture of compounds of iron, copper, and/or antimony, it is preferred to employ a weight ratio of iron compound:copper and/or antimony compound of from about 1:5 to about 5:1. Most preferred are additives comprising an iron compound and an antimony compound in a weight ratio of iron compound:antimony compound of from about 1:5 to about 5:1.

The additive may contain iron or iron and copper and/or antimony in various forms including various inorganic and organic compounds of each. Based on effectiveness, availability, economic and other considerations, inorganic compounds are preferred. Especially preferred when the translulcency of the final resin is not an objective are the common oxides of iron, copper anad antimony. However, various other compounds may be selected depending on the properties desired in the cured product. For example, where it is desired to retain the translucent character of the unsaturated polyester, it is advantageous to employ colorless salts, that is compounds of iron and copper and/or antimony that permit the transmission of light when incorporated in the polyester resin system and to minimize the proportions of opaque compounds such as the oxides. It has been found that up to about one-half weight percent of an opaque additive may be employed without an undue loss of translucency.

THE IRON COMPOUNDS

In the preparation of translucent polyester laminates and other products of the invention, iron salts that permit the transmission of light when incorporated in the cured polyester are preferred. Suitable iron salts are the colorless iron salts such as ferric sulfate hydrates. Other suitable salts which permit light transmission in the cured polyester include ferric fluoride, ferrous fluosilicate, ferrous hydroxide, ferrous sulfate, ferrous tartrate, ferrous stannate, ferrous chloride, ferrous ammonium sulfate, and the like.

Other substantially insoluble iron compounds that can be used in accordance with the invention include ferric acetate, ferric formate, ferric borate, ferric tungstate, ferric vanadate, ferric molybdate, ferrous tungstate, ferric oxalate, ferric ferrocyanide, ferric chlorendate, and ferric hexachloronorbornene carboxylate.

Especially useful in the compositions of the invention are the iron oxides, such as $Fe_2O_3$, $Fe_3O_4$ and FeO. In this specification including the examples thereof and in the claims the formula $Fe_2O_3$ is used to characterize ferric oxide, in its various polymorphic forms and hydrates, e.g., yellow iron oxide and red iron oxide.

The iron compounds named hereinabove are substantially insoluble in the polyester when admixed with a copolymerizable unsaturated monomer. Also useful are iron compounds that are soluble in the admixture of polyester and copolymerizable unsaturated monomer. Soluble iron compounds which are free of iron-to-carbon bonds are preferred. Useful soluble iron compounds include the metal or metalloxy beta-ketoenolates of the formula:

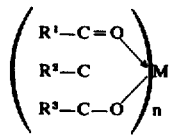

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^3$, halogen, nitro, and sulfo. Typical beta-ketonolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

THE COPPER COMPOUNDS

In the preparation of translucent polyester laminates and other products of the invention, copper salts that permit the transmission of light when incorporated in the cured polyester are employed. Suitable copper salts are the colorless copper salts such as anhydrous copper sulfate and copper cyanide. Other suitable salts which permit light transmission in the cured polyester include cupric chloride, cupric bromide, copper chloride dihydrate, copper sulfate pentahydrate, copper hydroxide chloride (paratacamite), basic copper chloride (atacamite), copper oxychloride (a mixture of paratacamite and atacamite), copper carbonate, copper borate, and the like. The copper compounds named hereinabove are substantially insoluble in the polyester when admixed with a copolymerizable unsaturated monomer.

Other substantially insoluble copper compounds that can be used in accordance with the invention include copper chlorendate, copper tungstate, copper molybdate, copper tetrafluoroborate, copper thiocyanate, copper chromate, cupric formate, cupric gluconate, cupric oxalate, copper phthalocyanine, cupric tartrate, and the like.

Especially useful in the compositions of the invention are the copper oxides, such as cuprous and cupric oxides.

Other copper compounds are cupric ethylacetoacetate, copper glycinate, cupric hexafluoroacetylacetonate, cupric hydroxyacetate, cupric lactate, cupric naphthenate, cupric octoate, cupric propionate, cupric stearate, cupric acetylacetonate, cupric butyrate, cupric isobutyrate, cupric citrate, cupric cyclohexanebutyrate, cupric dimethyl dithiocarbamate, cupric trifluoroacetylacetonate and cupric undecylenate.

THE ANTIMONY COMPOUNDS

The antimony constituent of the additive mixture is preferably antimony trioxide. However a wide variety of other antimony compounds may be employed, including the tetraoxide, pentaoxide, and various other inorganic compounds of antimony as well as the various organic compounds of antimony. Inorganic compounds include, for example, the antimony oxides, antimony sulfides, antimony tribromide, antimony trichloride, antimony tetrachloride, antimony trifluoride, antimony pentafluoride, antimony triiodide, antimony pentadiodide, antimony oxychloride, antimony trisulfate, antimony trrisulfide, antimony triselenide, antimony pentasulfide, antimony tritelluride, antimony tetrasulfide, antimony oxysulfide, antimony potassium tartrate, sodium antimonite, potassium antimonate, and the like. Colorless antimony compounds such as antimony trichloride, antimony tribromide, antimony trifluoride, sodium antimonate and the like may be advantageously employed in the preparation of translucent resins. Many organic antimony compounds are suitable such as the antimony salts of organic acids and their pentavalent derivatives, disclosed in U.S. Pat. No. 2,966,528 issued Aug. 15, 1961, entitled "Trivalent Antimony Salts of Organic Acids and Their Pentavalent Derivatives and Methods of Preparing Same". Compounds of this class include antimony butyrate, antimony valerate, antimony caproate, antimony heptalate, antimony caprylate, antimony perlargonate, antimony caprate, antimony cinnmate, antimony anisate, and their pentavalent halide derivatives. Likewise there may be employed the esters of antimonous acids and their pentavalent derivatives disclosed in U.S. Pat. 2,993,924, issued July 25, 1961, entitled "Esters of Antimonous Acid and Their Pentavalent Derivatives and Methods of Preparing Same", such as tris(n-octyl) antimonite, tris (2-ethylhexyl) antimonite, tribenzyl antimonite, tris ($\beta$-chloropropyl) antimonite, tris ($\beta$-chloroethyl) antimonite, tris $\beta$-chlorobutyl) antimonite, tris (butyl) antimonite and their pentavalent dihalide derivatives. Other suitable antimony compounds include the antimony esters of polyhydroxy compounds disclosed in U.S. Pat. No. 3,676,476 issued July 11, 1972, entitled "Method For Producing Trivalent and Pentavalent Antimony Esters of Polyhydroxy Compounds". Still other suitable organic antimony compounds are the cyclic antimonites such as trmethylolpropane antimonite, pentaerythritol antimonite, and glycerol antimonite.

Other iron, copper and antimony compounds which have desirable fire retardant properties, but which adversely affect the stability or cure of the polymer compositions can be employed if such compounds are used in an inactive form such as encapsulated or reacted or complexed with another compound. Such compounds include for example, ferric chloride copper acetylacetonate, cuprous chloride, cupric nitrate, cupric acetate, copper acrylate, copper naphthenate, copper stearate, and antimony sulfate. These compounds can be encapsulated for example, with gelation or other polymeric materials. Alternatively the compounds can be reacted or complexed with compounds such as nitro compounds or aromatic ethers or amines. An example of a suitable compound of this type is an amine salt of ferric chloride. In some instances, iron, copper or antimony compounds which are normally detrimental to the stability and/or cure of the resin which employed alone, can be employed without such detriment in a relatively smaller amount as a component in the additive mixture.

In addition, the additive mixture may be prepared from compounds, especially minerals, which contain both iron and copper and/or antimony, such as bornite ($5Cu_2S.Fe_2S_3$), or chalcopyrite ($Cu_2S.Fe_2S_3$).

The additive is preferably incorporated into the polyesters in a finely divided form. Preferred are particles passing through a 200 mesh standard sieve. Where translucent polyester products are desired, the additive mixture should not contain a sufficient quantity of particles in the size range approximating the wavelength of light, i.e., about 0.1 to 1.0 microns, to cause undesirable light scattering and resultant decrease in translucence. In practice it has been observed that iron compounds pulverized to pass completely through a 325 mesh screen contain sufficient fine particles to reduce the translucency of the polyester.

For best results, the compositions of this invention are essentially phosphorus-free, i.e., exclude phosphorus and compounds of phosphorus. Although the reason is not fully understood, it has been found that phosphorus tends to reduce or degrade the advantageous fire retardant properties achieved in the compositions of this invention.

THE CURING PROCESS

The polymerization conditions for effecting the cross-linking reaction between the unsaturated polyesters of this invention and the monomeric cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the monomer mixture employed as cross-linking agent and the exothermic characteristics of the polymerization mixture. A temperature is selected which will give a suitable reaction rate and yet not cause substantial volatilization; and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in monoolefin and thereafter effecting the copolymerization in the presence of catalyst and heat to produce the foamed article. Formulations which are useful for making moldings embodying the compositions of this invention may be made by mixing into the unsaturated linear polyester and unsaturated monomer mixture, an inert filler such as chopped fiber glass rovings, macerated fabric, asbestos fibers, mica, etc., which serve as fibrous reinforcing media and incorporating a small percentage of a mold lubricant, catalyst and/or promoter. A thermoplastic additive may be incorporated to control shrinkage. Auxiliary fire retardant additives such as hydrated alumina can be used to add to the fire retardance provided by the halogen and additive mixture of iron, and copper and/or antimony.

It is understood that dyes, pigments, plasticizers, luubricants and various other modifying agents are contemplated as being incorporated in certain formulations to produce compositions embraced in this invention in order to obtain or accentuate any given property.

The following examples are presented to illustrate this invention. Examples 1, 2 and 3 describe the preparation of typical halogen containing unsaturated polyesters which may be used in accordance with the invention in the preparation of fire retardant polymer compositions. Example 4 and those that follow describe the preparation and testing of fire retardant polymer compositions of this invention, as well as various comparative polymers. It is to be understood that the examples are not to be construed as limiting the invention. In the examples and elsewhere in this specification and claims, all temperatures are in degrees Celsius and all parts and percentages are by weight unless otherwise indicated.

PREPARATION OF POLYESTERS

EXAMPLE 1

1A A liquid unsaturated polyester resin having a molecular weight of about 1750, was prepared by the esterification reaction of about 157 parts of ethylene glycol and 38 parts of diethylene glycol with about 668 parts of 1, 4, 5, 6, 7, 7-hexachlorobicyclo-(2.2.1)-5-heptene-2,3-dicarboxylic anhydride and about 136 parts of fumaric acid, at a temperature of about 165°C for about 22 to 24 hours.

EXAMPLE 1B

About 70 parts of the product produced by the esterification reaction of Example 1A was mixed with about 15 parts of styrene and about 15 parts of methyl acrylate until complete solution was obtained to give a clear, substantially colorless solution of liquid polyester resin having a viscosity of about 30 poises at 25 degrees Celsium on a Gardner bubble viscometer and having a chlorine content of about 30 percent by weight of the total.

EXAMPLE 2

2A A liquid unsaturated polyester resin was prepared by esterifying about 157 parts of ethylene glycol and 38 parts of diethylene glycol with 668 parts of 1,4,5,6,7,7-hexachlorobicyclo-(2.2.1)-5-heptene-2,3-dicarboxylic acid and about 136 parts of fumaric acid at a reaction temperature of about 165°C for a period of about 10 hours. The unsaturated polyester resin, thus prepared had a final acid number of 49 to 56.

2B About 70 parts of the product produced by the esterification reaction of Example 1A was mixed with about 15 parts of styrene and about 15 parts of hydroxyethyl acrylate until complete solution was obtained, to give a clear, substantially colorless solution of liquid polyester resin having a viscosity of about 7 poises at 25 degrees Celsius on a Gardner bubble viscometer and having a chlorine content of about 29 weight percent of the total.

EXAMPLE 3

3A A liquid unsaturated polyester resin was prepared by the esterification reaction of about 268 parts of propylene glycol with 458 parts of 1,4,5,6,7,7-hexachlorobicyclo-(2.2.1)-5-heptene-2,3-dicarboxylic acid and about 274 parts of fumaric acid at a temperature of about 165°C for about 36–40 hours. The liquid polyester, thus prepared, had a molecular weight of about 2500.

3B About 15 parts of styrene and 15 parts of hydroxyethyl acrylate and about 70 parts of product produced by the esterification reaction of Example 3A were mixed together until complete solution was obtained to give a clear, substantially colorless solution of liquid polyester resin having a viscosity of about 25 poises at 25° Celsius on a Gardner bubble viscometer and having a chlorine content of about 19 percent by weight of the total.

The procedure of Examples 1, 2 and 3 was repeated substituting various amounts of other monomers in place of the styrene and acrylate shown. Additives comprising compounds of iron alone or in combination with compounds of copper and/or antimony were added. The type and amount of monomer and additives were varied as shown in Example 4 and the examples that follow. Castings of the resins were prepared and tested for fire retardance with the results shown. The castings were prepared by mixing 100 parts by weight of resin solution with an iron compounds or mixture of an iron compound and an antimony compound and/or a copper compound in the amount indicated in the tables, 0.2 part of 12 percent cobalt, octoate, and such other additives as are indicated in the tables. After at least 10 minutes stirring to assure uniform dispersion of the immiscible materials, the catalyst, methyl ethyl ketone peroxide (60% in dimethyl phthalate), 1 part was added, stirred for 1 to 2 minutes, and then the mixture was allowed to cure at 25 degrees Celsius for 16 hours and at 65 degrees Celsius for 8 hours. The castings were then removed from the mold, cut into specimen bars for testing. Burn rate and flame time were tested in accordance with the ASTM D-757-65 test method. Smoke density was tested using a modification of the ASTM D-2843-70, test method. Data on light absorption due to smoke obscuration was acquired by a computer which printed out the light absorption and percent smoke at one second intervals. The "Smoke Density Rating" of this modification of the ASTM test is the cumulative percent smoke at 60 seconds, 120 seconds, 180 seconds or 240 seconds, as indicated. Samples which were used for the ASTM D-2843-70 test measured 0.5 inch × 0.5 inch × 0.125 inch, or 1.0 inch × 1.0 inch × 0.125 inch as indicated in the tables.

In the examples the weight percent of additives is based on the weight of the resin. Thus, for example, 1.0 weight percent of an additive compound or mixture indicates one part by weight of the compound or mixture per one hundred parts of polymer composition.

TABLE I

| EXAMPLE NO. | POLYMER COMPOSITION | | | | ADDITIVE | | MEASUREMENTS | | | | |
|---|---|---|---|---|---|---|---|---|---|---|---|
| | Unsaturated Polyester of Example 1 (parts) | Monomer Mixture | | | $Fe_2O_3$ (parts) | $SbO_3$ (parts) | Burn Rate (in/min) | Flameout Time(secs) | Smoke density Rating % Sample Size | | Char % |
| | | Styrene (parts) | Comonomer Type* | Parts | | | | | (1) | (2) | |
| 4C** | 70 | 30 | — | — | 0 | 0 | 0.25 | 155 | 63 | | |
| 5C | 70 | 15 | MA | 15 | 0 | 0 | 0.42 | 180 | 58 | | |
| 6C | 70 | 30 | — | — | 0 | 2.0 | 0.09 | 148 | 46 | | |
| 7C | 70 | 15 | MA | 15 | 0 | 2.0 | 0.12 | 115 | 35 | | |
| 8C | 70 | 30 | — | — | 2.0 | 0 | 0.106 | 90 | 28 | | |
| 9 | 70 | 15 | MA | 15 | 2.0 | 0 | 0.08 | 60 | 16 | | |
| 10 | 70 | 15 | MA | 15 | 1.0 | 1.0 | 0.08 | 0 | 5 | 33 | 37 |
| 11 | 70 | 15 | MA | 15 | 2.5 | 2.5 | 0.08 | 0 | 2.5 | 40 | 32 |

TABLE I-continued

| EXAMPLE NO. | POLYMER COMPOSITION | | | | ADDITIVE | | MEASUREMENTS | | | | |
|---|---|---|---|---|---|---|---|---|---|---|---|
| | Unsaturated Polyester of Example 1 (parts) | Monomer Mixture | | | Fe₂O₃ (parts) | SbO₃ (parts) | Burn Rate (in/min) | Flameout Time(secs) | Smoke density Rating % Sample Size | | Char % |
| | | Styrene (parts) | Comonomer Type* | Parts | | | | | (1) | (2) | |
| 12C | 70 | 0 | MA | 30 | 1.0 | 1.0 | 0.17 | 66 | | 47 | 18 |

*MA = methyl acrylate
**In this and subsequent examples, the letter "C" designated a "control" example.
(1) sample size tested 0.5" × 0.5' × .125"; time 60 seconds
(2) sample size tested 1.0" × 1.0" × .125"; time 240 seconds In the examples of Table I, the interaction of a halogenated polyester (prepared as in Example 1A), a vinyl benzene compound, an acrylic compound and an iron compound to produce a polymer composition having improved fire retardant properties is shown. It may be seen from the data that the fire retardant properties of the halogenated polyester cross-linked with styrene monomer (Example 4C) are not improved substantially when methyl acrylate is substituted for a portion of the styrene (example 5C). The addition of antimony trioxide, a known fire retardant for halogen containing polyesters, provides a moderate improvement (Examples 6C and 7C.) A greater improvement in fire retardant properties of the styrene cross-linked polymer is achieved when the antimony compound is replaced with a compound of iron (Example 8C). The polymer composition of Example 8C is exemplary of the improved fire retardant compositions of our copending application Ser. No. 383,749, filed July 30, 1973. It will be seen by comparison (Example 9) that a still greater improvement is achieved in accordance with the present invention when a compound of iron is incorporated in a composition based on a halogen containing polyester cross-linked with a mixture of styrene and methyl acrylate. Furthermore, from a comparison of the data of Examples 7C and 9 with the data of Example 10, it will be seen that when a combination of a compound of iron and a compound of antimony is employed in the polymer compositions of the present invention, a synergistic effect is achieved; that is, the improvement in fire retardant properties is greater than might be expected on the basis of a simple additive effect. The importance of the monomer mixture is further demonstrated by comparison of Example 12C with Example 10. In the data of Example 12C, wherein styrene is not present in the monomer mixture, a pronounced deterioration of fire retardant properties is observed.

In Examples 13 through 22 of Table II, below is shown the fire retardant properties of polymer compositions prepared by cross-linking the unsaturated polyester of Example 2A with a monomer mixture of styrene and hydroxyethyl acrylate and incorporating various amounts of iron and antimony compounds in the resin mixture.

TABLE II

| Ex. NO. | POLYMER COMPOSITION | | | | ADDITIVE | | | MEASUREMENTS | | | |
|---|---|---|---|---|---|---|---|---|---|---|---|
| | Unsaturated Polyester of Example 2A | Monomer Mixture | | | Iron Compounds | (Parts) | Sb₂O₃ (Parts) | Burn Rate (in/ min) | Flameout Time (secs.) | Smoke Density Rating % | Barcol Hardness |
| | | Styrene (parts) | Comonomer Type* | Parts | | | | | | | |
| 13C | 70 | 15 | HEA | 15 | Fe₂O₃ | 0 | 2.0 | .143 | 107 | 73 | 30 |
| 14 | 70 | 15 | HEA | 15 | Fe₂O₃ | 2.0 | 0 | .083 | 42 | 38 | 40 |
| 15 | 70 | 15 | HEA | 15 | Fe₂O₃ | 1.0 | 1.0 | .078 | 0 | 33 | 39 |
| 16 | 70 | 15 | HEA | 15 | Fe₂O₃ | 1.0 | 3.0 | .067 | 0 | 37 | 43 |
| 17 | 70 | 15 | HEA | 15 | Fe₂O₃ | 2.0 | 3.0 | .094 | 0 | 30 | 43 |
| 18C | 70 | 30 | — | — | Fe₂O₃ | 1.0 | 1.0 | .063 | 0 | 53 | 41 |
| 19 | 70 | 15 | HEA | 15 | FeSnO₃ | 2.0 | 0 | | | 33 | 36 |
| 20 | 70 | 15 | HEA | 15 | FeSiF₆ | 2.0 | 0 | | | 42 | 37 |
| 21 | 70 | 20 | HEA | 10 | Fe₂O₃ | 2.0 | 0 | | | 56 | 41 |
| 22 | 70 | 20 | HEA | 10 | FeF₃ | 5.0 | 0 | | | 36 | 40 |

*at 120 seconds; sample size 1.0" × 1.0" × .125"
** HEA = Hydoxyethyl acrylate

In Examples 23 through 34 of Table III, below, is shown the fire retardant properties of polymer compositions prepared by cross-linking the unsaturated polyester of Example 1A with a monomer mixture of styrene and various acrylic compounds and incorporating an additive mixture of an iron compound and an antimony compound in the resin mixture, in the amounts shown.

TABLE III

| EX. NO. | POLYMER COMPOSITION | | | | ADDITIVE | | | MEASUREMENTS | | | |
|---|---|---|---|---|---|---|---|---|---|---|---|
| | Unsaturated Polyester of Example 1A (parts) | Monomer Mixture | | | Iron Compound (parts) | Sb₂O₃ (parts) | CuO | Burn Rate (in/min) | Flame Time (secs) | Smoke Density Rating % | Barcol Hardness |
| | | Styrene (parts) | Comonomer (type)** | (parts) | | | | | | | |
| 23 | 70 | 20 | HEA | 10 | Fe₂O₃ | 1.0 | 1 | 0 | 0.08 | 0 | 49 | 40 |
| 24 | 70 | 15 | HEA | 15 | Fe₂O₃ | 1.0 | 1 | 0 | 0.09 | 0 | 50 | 37 |
| 25 | 70 | 19 | HEMA | 11 | Fe₂O₃ | 1.0 | 1 | 0 | 0.07 | 0 | 54 | 45 |
| 26 | 70 | 15 | HEMA | 15 | Fe₂O₃ | 1.0 | 1 | 0 | 0.11 | 45 | 46 | 48 |
| 27 | 70 | 20 | HEA | 10 | Fe₂O₃ | 0.77 | 1.54 | 0 | 0.073 | 0 | 47 | 42 |
| 28 | 70 | 15 | MA | 15 | FeSnO₃ | 1.0 | 1.0 | 0 | 0.10 | 2.0 | 39 | 43 |

TABLE III-continued

| EX. NO. | POLYMER COMPOSITION | | | | ADDITIVE | | | MEASUREMENTS | | | |
|---|---|---|---|---|---|---|---|---|---|---|---|
| | Unsaturated Polyester of Example 1A (parts) | Monomer Mixture | | | Iron Compound (parts) | $Sb_2O_3$ (parts) | CuO | Burn Rate (in/min) | Flame Time (secs) | Smoke Density Rating % | Barcol Hardness |
| | | Styrene (parts) | Comonomer (type)** | (parts) | | | | | | | |
| 29 | 70 | 15 | MA | 15 | $Fe_2O_3$ 5.0 | — | 0 | 0.10 | 25 | 59 | 44 |
| 30 | 70 | 15 | M | 15 | $Fe_2O_3$ 1.0 | 1.0 | 0 | 0.08 | 0 | 56 | 49 |
| 31 | 70 | 15 | HEA | 15 | $FeF_3 \cdot 3H_2O$ 1.0 | 1.0 | 0 | 0.09 | 0 | 61 | 37 |
| 32 | 70 | 15 | BA | 15 | $Fe_2O_3$ 1.0 | 1.0 | 0 | 0.07 | 0 | 40 | 30 |
| 33 | 66 | 17 | HEA | 17 | $Fe_2O_3$ 1.0 | 1.0 | 0 | | | 58 | |
| 34 | 66 | 25.5 | HEA | 8.5 | $Fe_2O_3$ 1.0 | 1.0 | 0 | | | 55 | |
| 35 | 70 | 22.5 | MMA | 7.5 | $Fe_2O_3$ 0.5 | 0.51 | 0.51 | 0.135 | 55 | 65 | |
| 36 | 70 | 22.5 | MMA | 7.5 | $Fe_2O_3$ 1.0 | 1.0 | 0 | 0.125 | 90 | 62 | |
| 37 | 70 | 22.5 | EDM | 7.5 | $Fe_2O_3$ 1.0 | 1.0 | 0 | 0.05 | 0 | 54 | 47 |

* at 240 seconds sample size 1.0" × 1.0" × .125"
** MA = methyl acrylate
M = methacrylic acid
HEA = hydroxyethyl acrylate
BA = butyl acrylate
HEMA = hydroxyethyl methacrylate
MMA = methyl methacrylate
EDM = ethylene dimethacrylate

EXAMPLES 35–38

Resin solutions were prepared following the procedure of Example 3, from 70 parts of the unsaturated polyester of Example 3A and 30 parts of monomer. In Example 35C, a control example, the monomer consisted of 30 parts of styrene. In Examples 36–38 the monomer consisted of 15 parts of styrene and 15 parts of hydroxyethyl acrylate. Iron and/or antimony compounds were incorporated into the solution in the amounts shown below and castings prepared and cured as previously described. Specimens of the castings were tested for fire retardant properties with the results as shown in Table IV.

EXAMPLES 39–47

Resin solutions were prepared following the procedure of Example 2, from 70 parts of the unsaturated polyester of Example 3A and 30 parts of various proportions of styrene and hydroxyethyl acrylate. Iron and/or antimony compounds were incorporated into the solution in the amounts shown below and castings were prepared and cured as previously described. Specimens of the castings were tested for fire retardant properties with the results as shown in Table V.

TABLE V

| EXAMPLE NO. | POLYMER COMPOSITION | | | | ADDITIVE | | MEASUREMENTS | | | |
|---|---|---|---|---|---|---|---|---|---|---|
| | Unsaturated Polyester of Example 2A (parts) | Monomer Mixture | | | $Fe_2O_3$ (parts) | $Sb_2O_3$ (parts) | Burn Rate (in/min) | Flameout Time (secs) | Smoke Density Rating** (%) | Barcol Hardness |
| | | Styrene (parts) | Monomer Type* | (parts) | | | | | | |
| 42 | 70 | 15 | HEA | 15 | 2 | 0 | 0.14 | 51 | 51 | 41 |
| 43 C | 70 | 15 | HEA | 15 | 0 | 2 | 0.17 | 59 | 81 | 41 |
| 44 | 70 | 15 | HEA | 15 | 1 | 1 | 0.09 | 0 | 47 | 41 |
| 45 | 70 | 15 | HEA | 15 | 2.5 | 2.5 | 0.09 | 0 | 38 | 42 |
| 46 | 70 | 7.5 | HEA | 22.5 | 2 | 0 | 0.24 | 92 | 54 | 38 |
| 47 | 70 | 22.5 | HEA | 7.5 | 2.0 | 0 | 0.08 | 0 | 64 | 38 |
| 48 | 70 | 22.5 | HEA | 7.5 | 1 | 1 | 0.08 | 0 | 42 | 42 |
| 49 | 70 | 22.5 | HEA | 7.5 | 2.5 | 2.5 | 0.08 | 0 | 48 | 48 |
| 50 C | 70 | 30 | — | 0 | 1 | 1 | | | 71 | 25 |

*HEA = hydroxyethyl acrylate
**at 240 seconds; sample size 1.0" × 1.0" × 0.125"

What is claimed is:

1. A fire retardant polyester polymer composition comprising
   1. a mixture copolymerizable to an infusible resin consisting essentially of

TABLE IV

| EXAMPLE NO. | POLYMER COMPOSITION | | | | ADDITIVE | | MEASUREMENTS | | | |
|---|---|---|---|---|---|---|---|---|---|---|
| | Unsaturated Polyester of Example 3A (parts) | Monomer Mixture | | | $Fe_2O_3$ (parts) | $Sb_2O_3$ (parts) | Burn Rate (in/min) | Flameout Time (secs) | Smoke Density Rating** (%) | Barcol Hardness |
| | | Styrene (parts) | Monomer Type* | (parts) | | | | | | |
| 38 C | 70 | 30 | — | — | 1.0 | 1.0 | 0.099 | 85 | 75 | 41 |
| 39 C | 70 | 15 | HEA | 15 | — | 2.0 | 0.146 | 122 | 82 | 45 |
| 40 | 70 | 15 | HEA | 15 | 2.0 | — | 0.104 | 130 | 43 | 46 |
| 41 | 70 | 15 | HEA | 15 | 1.0 | 1.0 | 0.055 | 44 | 40 | 46 |

*HEA = hydroxyethyl acrylate
**at 240 seconds, sample size 1.0" × 1.0" × 0.125"

a. from about 50 to 80 wt. % of an α, β - ethylenically unsaturated halogen-containing polyester of a polycarboxylic compound and a polyhydric alcohol, the polyester containing halogen in a proportion of greater than about 4 weight percent; and b. from about 20 to about 50 weight percent of a mixture of unsaturated monomers comprising a vinyl benzene compound and an acrylic compound selected from the group consisting of acrylic acid, methacrylic acid and esters thereof, the weight ratio of vinyl benzene compound to acrylic compound being about 1:4 to 4:1; and 2. an effective fire retardant proportion of about 0.5 to about 10 weight percent of a smoke inhibiting additive consisting essentially of at least 0.5 weight percent of a compound of iron or a mixture of said iron compound with a compound of copper and/or a compound of antimony with the proviso that when said additive is a compound of iron that is soluble in said polyester, the compound of iron is free of iron-to-carbon bonds, said composition being substantially phosphorous-free and said proportions and weight percents being based on the weight of the copolymerizable mixture.

2. The composition of claim 1 wherein said halogen is present as a halogen-containing polycarboxylic compound.

3. The composition of claim 2 wherein said halogen is chlorine.

4. The composition of claim 2 wherein said polycarboxylic compound is chlorendic acid or chlorendic anhydride.

5. The composition of claim 1, wherein said additive consists essentially of a compound of iron as the sole effective component thereof.

6. The composition of claim 5 wherein said halogen is present as a halogen-containing polycarboxylic acid.

7. The composition of claim 6 wherein said polycarboxylic compound is chlorendic acid or chlorendic anhydride.

8. The composition of claim 7 wherein said vinylbenzene compound is styrene.

9. The composition of claim 8 wherein said acrylic compound is an ester of acrylic acid.

10. The composition of claim 9 wherein said additive is an inorganic compound of iron.

11. The composition of claim 10 wherein said acrylic compound is methyl acrylate.

12. The composition of claim 10 wherein said acrylic compound is hydroxyethyl acrylate.

13. The composition of claim 12 wherein said additive is ferric oxide.

14. The composition of claim 12 wherein said additive is $FeSnO_3$.

15. The composition of claim 12 wherein said additive is $FeSiF_6$.

16. The composition of claim 12 wherein said additive is $FeF_3$.

17. The composition of claim 8 wherein said acrylic compound is an ester of methacrylic acid.

18. The composition of claim 17 wherein said additive is an inorganic compound of iron.

19. The composition of claim 18 wherein said additive consists essentially of from about 1.0 to about 5.0 weight percent of iron oxide based on the weight of said copolymerizable mixture.

20. The composition of claim 1 wherein said additive consists essentially of a compound of iron and a compound of copper and/or a compound of antimony.

21. The composition of claim 20 wherein said additive consists essentially of a compound of iron and a compound of copper.

22. The composition of claim 20 wherein said additive consists essentially of a compound of iron and a compound of antimony.

23. The composition of claim 22 wherein said halogen is present as a halogen-containing polycarboxylic acid.

24. The composition of claim 23 wherein said polycarboxylic compound is chlorendic acid or chlorendic anhydride.

25. The composition of claim 24 wherein said vinylbenzene compound is styrene.

26. The composition of claim 25 wherein said acrylic compound is methacrylic acid.

27. The composition of claim 26 wherein said mixture of unsaturated monomers comprises about 25 to about 35 weight percent of styrene and methacrylic acid and said additive consists essentially of 1.0 to 5.0 weight percent of a mixture of iron and antimony oxides in a weight ratio of iron oxide: antimony oxide of from about 1:5 to about 5:1.

28. The composition of claim 25 wherein said acrylic compound is an ester of methacrylic acid.

29. The composition of claim 28 wherein said additive is a mixture of an inorganic compound of iron and an inorganic compound of antimony.

30. The composition of claim 29 wherein said additive consists essentially of about 1.0 to about 5.0 weight percent of a mixture or iron and antimony oxides in a weight ratio of iron oxide: antimony oxide of from about 1:5 to about 5:1.

31. The composition of claim 30 wherein said acrylic compound is hydroxyethyl methacrylate.

32. The composition of claim 30 wherein said acrylic compound is methyl methacrylate.

33. The composition of claim 25 wherein said acrylic compound is an ester of acrylic acid.

34. The composition of claim 33 wherein said additive is a mixture of an inorganic compound of iron and an inorganic compound of antimony.

35. The composition of claim 34 wherein said additive consists essentially of about 1.0 to about 5.0 weight percent of a mixture of iron and antimony oxides in a weight ratio of iron oxide: antimony oxide of from about 1:5 to about 5:1.

36. The composition of claim 35 wherein said acrylic compound is hydroxyethyl acrylate.

37. The composition of claim 35 wherein said acrylic compound is methyl acrylate.

38. The composition of claim 35 wherein said acrylic compound is butyl acrylate.

39. The composition of claim 34 wherein said inorganic compound of iron is ferric oxide.

40. The composition of claim 34 wherein said inorganic compound of iron is $FeSnO_3$.

41. The composition of claim 34 wherein said inorganic compound of iron is $FeF_3$.

42. The composition of claim 20 wherein said additive consists essentially of a compound of iron, a compound of copper and a compound of antimony.

43. The composition of claim 42 wherein said polycarboxylic compound is chlorendic acid or chlorendic anhydride and said mixture of unsaturated monomers comprises a mixture of styrene and methyl methacrylate.

44. The composition of claim 4 wherein said mixture of unsaturated monomers comprises a mixture of styrene and an acrylic compound selected from the group alkyl acrylates, alkyl methacrylates, hydroxyalkyl acrylates, hydroxyalkyl methacrylates, haloalkyl acrylates, and haloalkyl methacrylates wherein the alkyl group is from 1 to 8 carbon atoms.

45. The composition of claim 1 when polymerized to an infusible product.

46. The composition of claim 30 wherein said acrylic compound is ethylene dimethacrylate.

* * * * *